Figure 1:
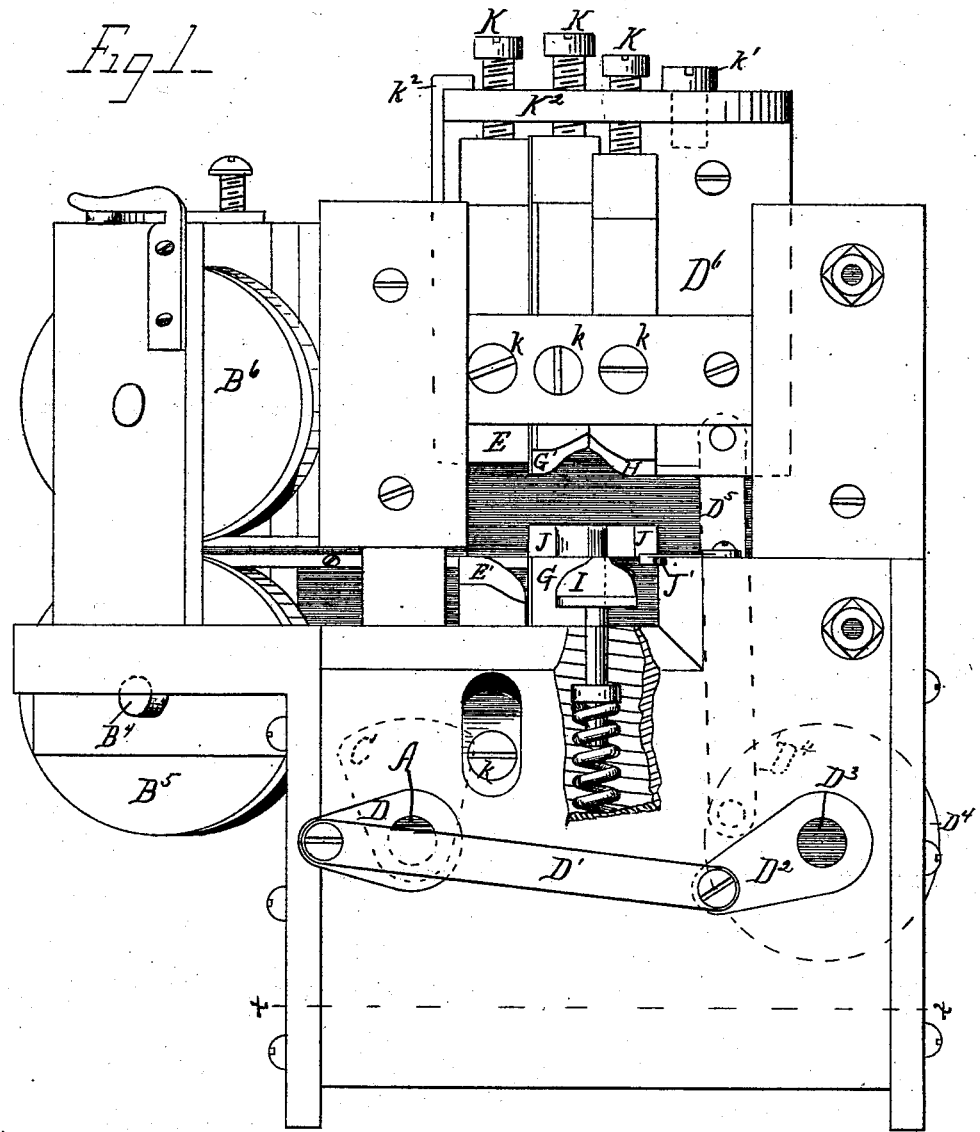

(Model.)

E. & A. G. CHILDREN.

MACHINE FOR MAKING FENCE BARBS.

No. 255,413. Patented Mar. 28, 1882.

Witnesses—
J. Everett Brown
H. M. Munday

Inventors—
Edwin Children and
Arthur G. Children
By Munday Evarts & Adcock
their Att'ys.

(Model.)
E. & A. G. CHILDREN.
MACHINE FOR MAKING FENCE BARBS.
No. 255,413.  Patented Mar. 28, 1882.
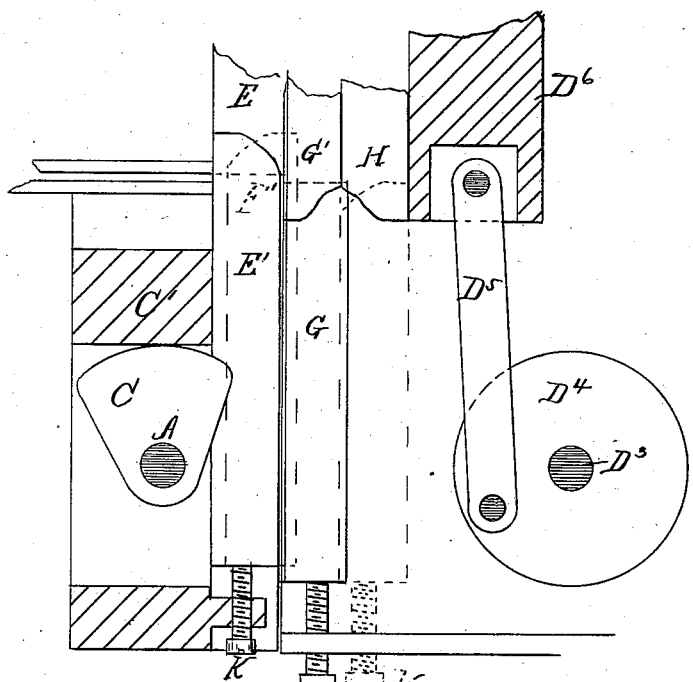
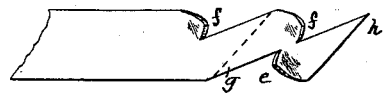
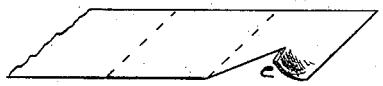
Witnesses—
J. Everett Brown
A. M. Munday.
Inventors—
Edwin Children and
Arthur G. Children
By Munday, Evarts & Adcock
their atty's.

(Model.)
E. & A. G. CHILDREN.
MACHINE FOR MAKING FENCE BARBS.
No. 255,413. Patented Mar. 28, 1882.
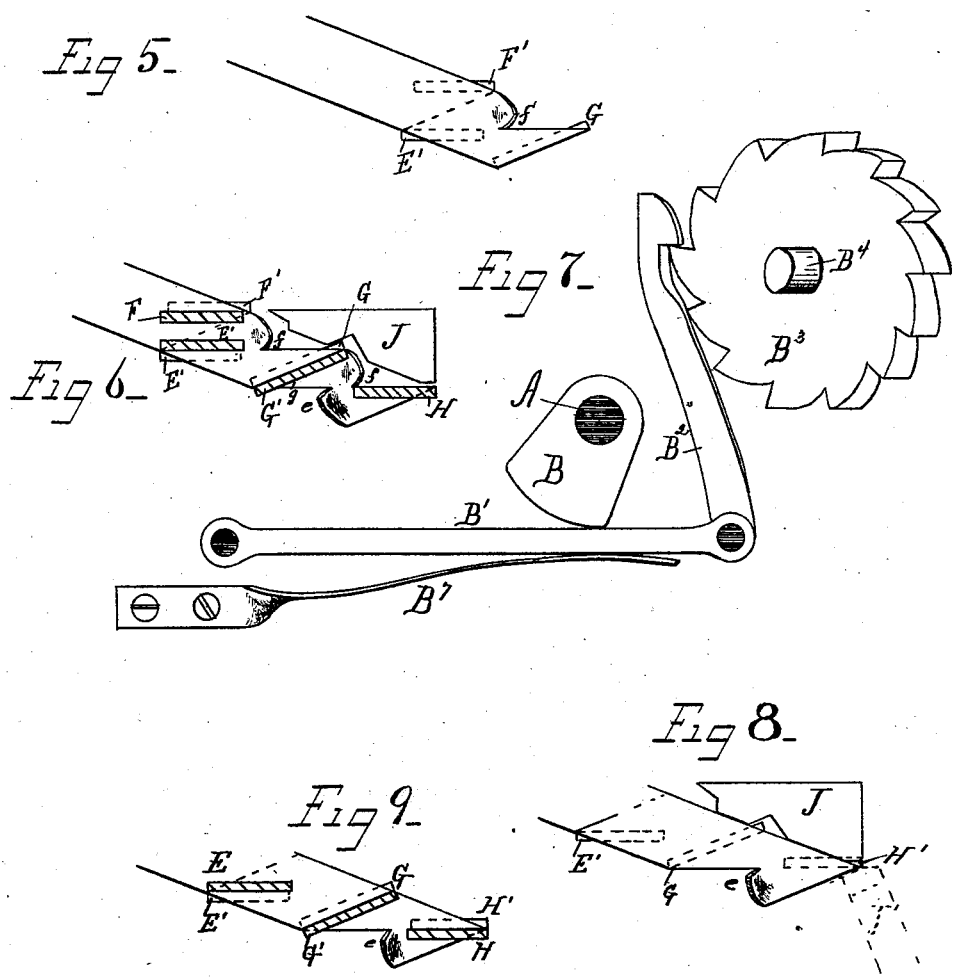

(Model.)

E. & A. G. CHILDREN.
MACHINE FOR MAKING FENCE BARBS.

No. 255,413. Patented Mar. 28, 1882.

5 Sheets—Sheet 4.

Witnesses
J. Everett Brown
H. W. Munday

Inventors
Edwin Children and
Arthur G. Children
By Munday, Evarts & Adcock
Their Atty's (Model.)　　　　　　　　　　　　　　　　　　5 Sheets—Sheet 5.
E. & A. G. CHILDREN.
MACHINE FOR MAKING FENCE BARBS.

No. 255,413.　　　　　　　　　　Patented Mar. 28, 1882.

UNITED STATES PATENT OFFICE.

EDWIN CHILDREN AND ARTHUR G. CHILDREN, OF EAST DUBUQUE, ILL.

MACHINE FOR MAKING FENCE-BARBS.

SPECIFICATION forming part of Letters Patent No. 255,413, dated March 28, 1882.

Application filed October 26, 1881. (Model.)

*To all whom it may concern:*

Be it known that we, EDWIN CHILDREN and ARTHUR G. CHILDREN, of East Dubuque, Jo Daviess county, in the State of Illinois, have invented certain new and useful Improvements in Machines for Making Fence-Barbs, of which the following is a specification.

This invention relates to machines for cutting and forming sheet-metal barbs of the class known as the "Frentress barb" from an intermittently-fed strip of narrow metal, and is a modification of a machine patented to us February 11, 1879. As in our said patent, the strip of material is fed to the knives, by which the barb is cut off and shaped in an angling direction, so that the line upon which they are severed is a diagonal one across the strip, and the blanks are diamond-shaped.

The present invention differs from the former one in that the blank is slit at one or both ends before it is severed, part of the prongs being formed in the same operation; and the invention chiefly lies in the mechanism by which the slitting and partial forming are done when combined with mechanism for severing and completing the formation of the barb, as hereinafter stated. An intermittent feed being given to the bar of material from which the barbs are formed, one or more sets of slitting and forming knives located in advance of the severing-knives, so that they operate upon the material before the severing, act at proper intervals and slit the metal from the side thereof in a direction toward the heart of the blank, such knives, when two sets are used, being placed upon opposite sides of the feed-line, with one set in advance of the other. These slitting-knives also give direction to the prong which they cut free at the time of cutting and in the act thereof. We also employ cutting-off knives which are also forming-knives, and by means thereof give direction to one of the two points not bent by the slitting-knives. This function is permitted by the peculiar form given the blades, the under stationary one being straight and the upper moving one being ground so as to give it the edge shown, and whereby one portion of said moving blade continues its descent after it has cut through the bar and bends the prong lying under it, while the other portion of the blade is completing the severing operation. The fourth point is bent by a forming device, which may be one blade of a pair of slitting-knives moving in unison with the severing-knife. Where but a single set of slitting-knives are used in advance of the cutting-off knives another set of slitting and forming knives are placed in the rear of the severing-knives, which act simultaneously with the latter and slit the end of the blank not already slit. In this case the moving former necessary for bending the fourth point, as above mentioned, may be used as a knife and as part of the rear set of slitting-knives. The barb-blank during the severing operation rests upon a yielding former, which descends under the action of the upper knife and assists in the bending of the prong, and avoids interference with the knife by making room for its descent. This former is double-faced, so that both the down prongs may be shaped upon it. It serves the further office of returning the barb, after it is completed, to the level of the feed, so that it will be thrown out by the forward push of the barb-strip. All the lower moving knives are held in a single frame and move simultaneously to their work in obedience to a single motive device, and the upper moving parts are similarly held and actuated.

Figure 10:
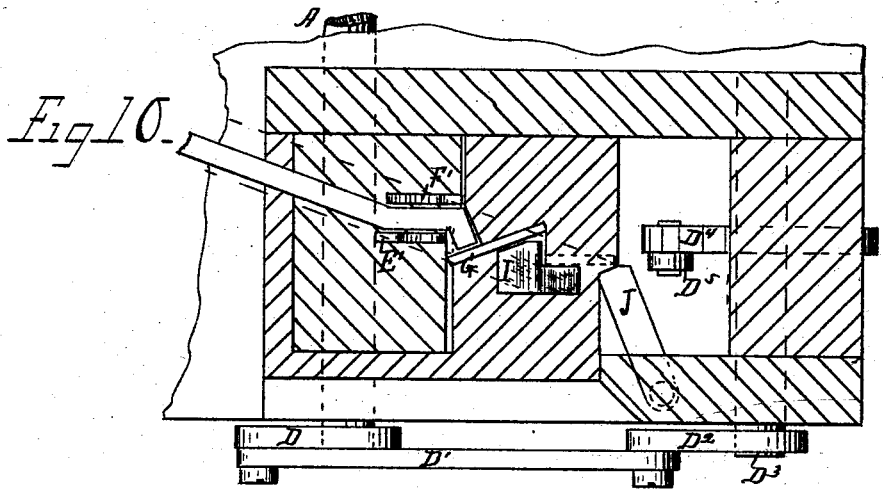
Figure 11:
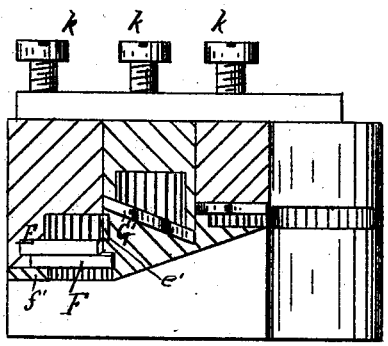
Figure 12:
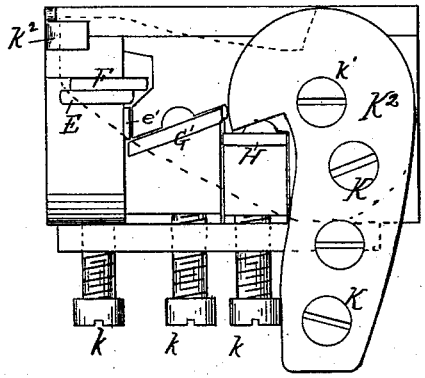
Figure 13:
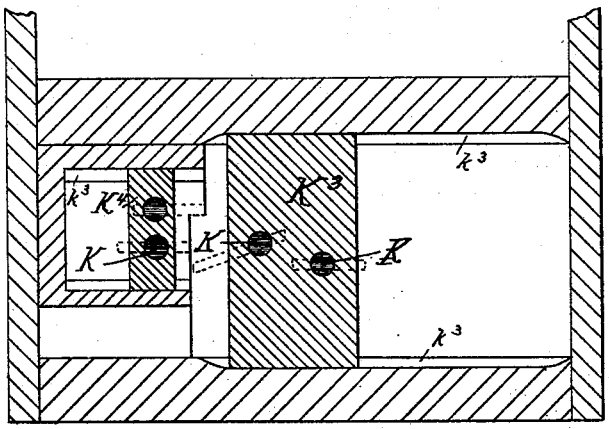

In the drawings, Figure 1 is an elevation of the machine; Fig. 2, a partial vertical section thereof. Figs. 3 and 4 show the barb-strip as it appears just before the final operation in the two methods of operation of which our machine is capable. Figs. 5 and 6 are horizontal sections intended to show the position of the knives, the first one being taken upon the level of the barb-strip, showing the under knives in dotted lines and the other just above and through the upper knives. Fig. 7 is a diagram of the ratchet-wheel and pawl and their operating devices, whereby the step-by-step feed of the barb material is caused. Figs. 8 and 9 show the position of the knives in the alternate arrangement which the machine permits. Fig. 10 is a horizontal section upon the line of the feed, and Fig. 11 a bottom view of the upper knives. Figs. 12 and 13 show some details of the knife-holding devices.

Referring to said drawings, A represents the power-shaft of the machine. It carries a cam, B, which actuates a lever, B', to which the pawl B² is jointed, and thereby moves the ratchet B³ upon the shaft B⁴, whereon is also a feed-roller, B⁵, located under the feed. Another roller, B⁶, matching roller B⁵, is placed above the latter, and causes the necessary friction to feed the metal bar forward. A spring, B⁷, lifts the pawl-lever after each action thereon of the cam B. In this way we obtain an even step-by-step feed of the material.

The shaft A also carries another cam, C, which raises at proper intervals the head C', carrying one or more slitting-knives. Through the crank D upon the shaft A, a connecting-lever, D', and a crank, D², a shaft, D³, upon which the crank D² is keyed, is oscillated, and such oscillation is by a crank-disk, D⁴, and lever D⁵ communicated to the head D⁶, so that the latter, with its knives, hereinafter specified, is reciprocated at proper intervals.

We provide a pair of knives for each of the cutting operations. The first slitting operation is performed upon the front or infeed end of the barb by the upper knife E, held in the head D⁶, and the lower reciprocating knife E', held in the head C'. The former is placed in the head D⁶, so it may be lifted out of the way of the prong as the latter is fed along, said prong (see e) being the one formed upon the side of the bar by said slit and turned up by the under knife E', aided by the conjoint shearing action of the two blades. The next slit is imparted to the rear or outfeed end of the barb by the upper knife F in the head D⁶, and the lower one F' in the head C', and thereby another prong, f, is formed and bent upward. These two pairs of knives act upon adjoining blanks before such blanks are cut off, and of course upon different sides of the barb-strip. The severing is done by the lower stationary blade G and the upper moving one, G', in the head D⁶. The upper blade is shaped similarly to the slitting-knives, so as to be gradual in its operation, as clearly seen in Fig. 1. They also give direction to the prong g at the time of severing the blank. The remaining prong, h, is bent by the forming device H in the head D⁶. This device H, which is located in the rear of the cutting-off knives, I prefer to make in such fashion that it will act as a former only, or as the moving blade of a pair of slitting and forming knives, which I sometimes use at that point, as hereinafter to be explained. This latter purpose can be effected by shaping it like the other slitting-blades. The feed which takes place between the operations of the knives moves the barb-strip into the machine the length of a blank at each movement. The various devices are relatively placed so that the first slitting-knives will act upon the second blank and the second slitting-knives upon the first blank in front of the severing-point, while the device H operates upon the blank which is being severed. All these operations are performed substantially at the same time— that is, between the movements of the feed— though, as shown, the severing and the forming of the prong h occur a little later than the slitting operations. So long as all the knives are out of the way at the moment the feed takes place it matters little whether they act successively or simultaneously.

I prefer to employ with the severing-blades and latest former a yielding support, I, located so that the barb, when in position to be severed, lies directly upon it. This support is fashioned, as shown, so that its slopes will assist to give the proper turn to the downward prongs, and it is made yielding, so that the severing-edges may have room to pass each other; but its principal function is to return the barb from the depressed level into which it is forced by the severing to the level of the feed, so that as the incoming feed takes place it may be in position to receive the force thereof and be driven out of the knives. The knives E F are accompanied in their movements by forming devices e' and f', respectively placed at the side thereof, which devices tend to form a sharp corner at the junction of the prong with the center or body of the barb, and to confine the bend to the prong.

The severing-knives may be placed so they cut upon a line running from a point within the slit edges upon one side of the bar of material to a point within the slit edge upon the other side, as illustrated at Figs. 3 and 4. When so located the points formed by the operation of these knives will necessarily be sharp, whereas if the cut be from the outside edges of the bar there is a liability that one or two of the points may not be sharp. When poor stock is used this feature will be of value.

A stationary guide, J, is placed upon the inside of the line of feed and the spring-guide J' upon the other side. The latter is placed where its point will bear against the end of the barb during the final operations thereon. It insures accuracy in positioning. Its angling position leaves but its tip lying within the space traversed by the barb in its exit, and this is effectually cleared by the spreading of the prongs.

There is another arrangement of knives of which the machine is capable, and which is illustrated in Figs. 8 and 9. In this we dispense with the initial knives F and F', and employ in their stead the forming-blade H and its lower stationary companion blade, H', these latter blades slitting the forward end of the barb and bending both the prongs at that end at once. If with this arrangement the yielding support I is not used, the blades H and H' may be differently adjusted if they do not bend the prongs sufficiently. The knives are adjusted longitudinally by set-screws K K and laterally by other screws, k k k. These longitudinal screws pass through movable bars K² K³ K⁴, of which the upper one swings upon a pivot, k', at one end and under a stationary catch or retaining device, k², at the other end. There are two bars at the bottom, one for the moving knives and one for the stationary ones. They are both inserted in lateral slots $k^3$ in their holding-frames, so that they can be slipped to one side. By thus making the screw-holding bars movable the knives are rendered readily removable. Figs. 12 and 13 are intended to illustrate these features of the machine.

We claim—

1. In a machine for cutting and forming sheet-metal barbs from an intermittently-fed strip of metal, the combination of two sets of slitting and forming knives operating upon a bar of material, a set of severing and forming knives, and a forming device for forming the prong, substantially as specified.

2. In a machine for cutting and forming sheet-metal barbs from an intermittently-fed strip of metal, the combination, with the barb cutting and forming knives, of the yielding support for assisting in the forming operation and returning the completed barb to the level of the feed, substantially as specified.

3. The combination of two pairs of slitting and forming knives, and a pair of severing-knives, which also form one of the prongs, substantially as specified.

4. The combination, with the slitting and forming knives, of the forming devices $e'$ and $f'$, accompanying the moving halves thereof, substantially as and for the purpose set forth.

5. The combination, with the devices for severing and completing the barb, of the spring-guide $J'$, substantially as set forth.

EDWIN CHILDREN.
ARTHUR G. CHILDREN.

Witnesses:
GEO. BECHTEL,
GEO. W. KIESEL.